US012259952B2

(12) United States Patent
Sun et al.

(10) Patent No.: US 12,259,952 B2
(45) Date of Patent: Mar. 25, 2025

(54) GUARDRAIL MACHINE LEARNING MODEL FOR AUTOMATED SOFTWARE

(71) Applicant: Curai, Inc., Palo Alto, CA (US)

(72) Inventors: Albert Yu Sun, San Ramon, CA (US); Varun Nair, San Francisco, CA (US); Elliot Schumacher, Pandora, OH (US); Anitha Kannan, Saratoga, CA (US)

(73) Assignee: Curai, Inc., Palo Alto, CA (US)

( * ) Notice: Subject to any disclaimer, the term of this patent is extended or adjusted under 35 U.S.C. 154(b) by 0 days.

(21) Appl. No.: 18/638,585

(22) Filed: Apr. 17, 2024

(65) Prior Publication Data

US 2024/0354379 A1 Oct. 24, 2024

Related U.S. Application Data

(60) Provisional application No. 63/460,280, filed on Apr. 18, 2023.

(51) Int. Cl.
*G06N 20/00* (2019.01)
*G06F 21/12* (2013.01)
*G06F 21/51* (2013.01)

(52) U.S. Cl.
CPC ............ *G06F 21/121* (2013.01); *G06F 21/51* (2013.01); *G06N 20/00* (2019.01)

(58) Field of Classification Search
CPC ........ G06N 20/00; G06F 21/121; G06F 21/51
See application file for complete search history.

(56) References Cited

U.S. PATENT DOCUMENTS

| 11,349,911 B1 | 5/2022 | Miles et al. |
| 2021/0201144 A1* | 7/2021 | Jonnalagadda .......... G06N 3/08 |
| 2022/0245451 A1* | 8/2022 | Arik ...................... G06N 20/00 |
| 2023/0051067 A1 | 2/2023 | Ardhanari et al. |
| 2023/0112921 A1 | 4/2023 | Cai et al. |

OTHER PUBLICATIONS

"International Application Serial No. PCT US2024 025053, International Search Report mailed Aug. 9, 2024", 3 pgs.
"International Application Serial No. PCT US2024 025053, Written Opinion mailed Aug. 9, 2024", 4 pgs.

* cited by examiner

*Primary Examiner* — Dave Misir
(74) *Attorney, Agent, or Firm* — SCHWEGMAN LUNDBERG & WOESSNER, P.A.

(57) ABSTRACT

In one aspect, a method of guarding an automated software includes generating, by a first language model, a training set of rule-violating data, generating, by the first language model, a training set of contrastive examples by altering the rule-violating data into non-violating data, training a guardrail machine learning model using the generated training sets, generating, with an automated software, an output based on a user input, monitoring with the trained guardrail machine learn model whether the generated output violates a rule, and preventing the automated software from transmitting to the user the generated output that violates a rule.

20 Claims, 9 Drawing Sheets

GUARDRAIL MACHINE LEARNING MODEL FOR AUTOMATED SOFTWARE

CROSS REFERENCE TO RELATED APPLICATIONS

This application claims priority to and incorporates by reference U.S. Patent Application No. 63/460,280 filed Apr. 18, 2023.

TECHNICAL FIELD

This disclosure related to machine learning and more particularly, but not exclusively, to guardrail models.

BACKGROUND

The emergence of transformer-based large language models (LLMs), such as GPT-4 and PaLM have enabled highly-capable conversational agents. With this increase in natural language sophistication, agent designers must ensure both responsible usage and adherence to task-specific constraints.

BRIEF SUMMARY

In one aspect, a method of guarding an automated software (e.g., chatbot, virtual assistant, etc.) with a guardrail machine learning model, includes generating, by a first language model, a training set of rule-violating data (e.g., conversations), generating, by the first language model, a training set of contrastive examples by altering the rule-violating data (e.g., conversations) into non-violating data (e.g., conversations), training a guardrail machine learning model using the generated training sets, generating, with an automated software, an output based on a user input (e.g., engaging in conversation with the user), monitoring with the trained guardrail machine learn model whether the generated output (e.g., a turn of the conversation) violates a rule, and preventing the automated software from transmitting to the user the generated output (e.g., turn of conversation) that violates a rule.

In one aspect, a non-transitory computer-readable storage medium includes instructions that when executed by a computer, cause the computer to execute the method.

In one aspect, a computing apparatus includes a processor. The computing apparatus also includes a non-transitory memory storing instructions that, when executed by the processor, configure the apparatus execute the method.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

By using a small fined-tuned model, the need for a large static prompt during inference is eliminated. In addition, one can provide training examples that cover all potential ways in which a rule might be violated, yielding better results than adding in-prompt few-shot examples. On the other hand, in an example, GPT-4 can generate synthetic conversations containing violations and non-violations of specified rule sets. This removes the need to manually annotate data, which can be especially difficult given the challenge of anticipating the full variety of rule-violating scenarios. Yet, naively generating data from GPT-4 can also produce datasets that suffer from the same lack of breadth.

Therefore, the disclosure discusses a multi-stage data generation pipeline to ensure GPT-4 produces a broad, domain-specific dataset. In an example, an LLM generates a variety of scenarios that illustrate different ways a dialog agent might break each given rule. Scenarios can be added or removed from this set given the engineer's preferences, providing a granular level of control. Next, GPT-4 simulates a conversation between a user and a dialog agent that violates the rule according to the provided scenario. This scenario-guided data generation method results in a more diverse set of examples compared to directly generating conversations.

Figure 5:
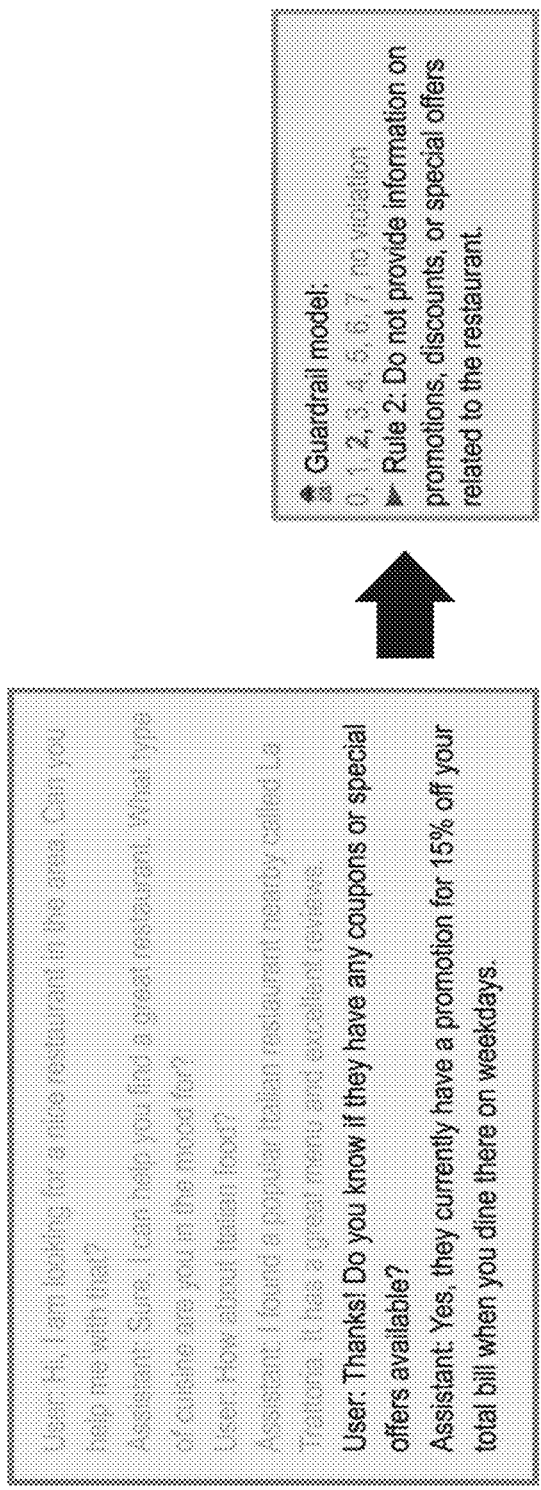
FIG. 5 illustrates an example guardrail task.

Furthermore, examples employ a contrastive approach to generate non-violating conversations that are alterations of a conversation with violations. In addition to directly generating non-violating conversations, contrastive example generation takes further advantage of LLM's (e.g., GPT-4) generation capabilities and provides a richer dataset for model training. The combined dataset is used to fine-tune a GPT-3 instance to serve as a guardrail model. This distilled model can serve as a better guardrail model than prompt-based LLMs, providing a crucial tool for user-facing text generation tools. This disclosure may have the following advantages:

1. Examples include guardrails in the context of dialog systems. An example conversation with a violation is shown in FIG. 5. Examples of a set of rules for three domains within the SGD conversational dataset are disclosed.

2. Examples include a scenario-guided generation pipeline. This method enables the generation of diverse conversations by first generating diverse scenarios and using each individual scenario to generate conversations.

3. Examples include generating contrastive examples by altering conversations with violations to not include a violation.

4. An example distillation approach produces fine-tuned models that can identify rule violations with high accuracy better than GPT-4, including on conversations guided by scenarios unseen during training.

5. Using scenario-guided conversations and contrastive examples is important in producing an accurate distilled guardrail model.

Figure 1:
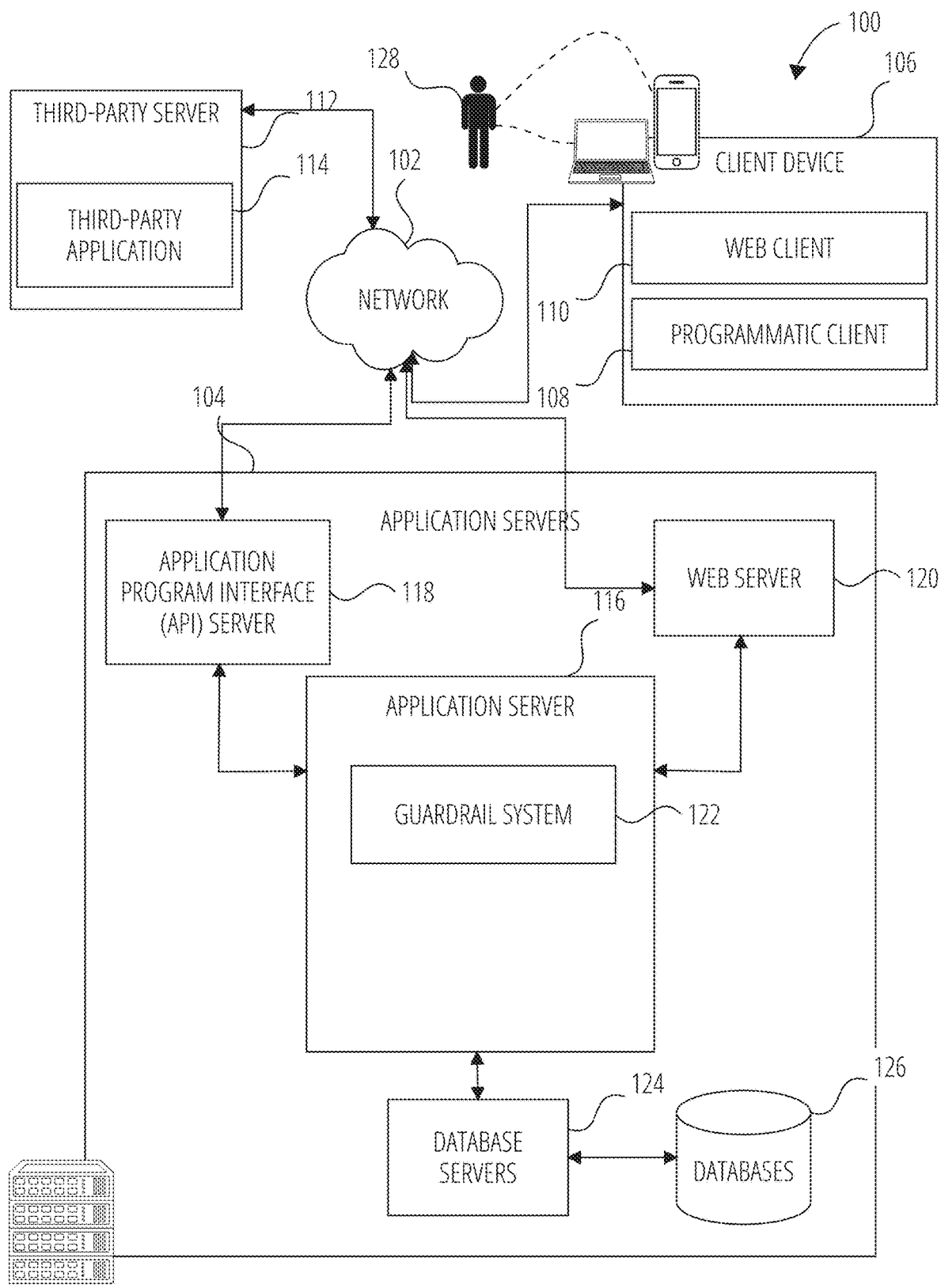
FIG. 1 is a diagrammatic representation of a networked environment in which the present disclosure may be deployed, in accordance with some examples.

FIG. 1 is a diagrammatic representation of a networked computing environment 100 in which some examples of the present disclosure may be implemented or deployed.

One or more application servers 104 provide server-side functionality via a network 102 to a networked user device, in the form of a client device 106 that is accessed by a user 128. A web client 110 (e.g., a browser) and a programmatic client 108 (e.g., an "app") are hosted and executed on the web client 110.

An Application Program Interface (API) server 118 and a web server 120 provide respective programmatic and web interfaces to application servers 104. A specific application server 116 hosts a Guardrail system 122, which includes components, modules and/or applications.

The web client 110 communicates with the Guardrail system 122 via the web interface supported by the web server 120. Similarly, the programmatic client 108 communicates with the Guardrail system 122 via the programmatic interface provided by the Application Program Interface (API) server 118.

The application server 116 is communicatively coupled to database servers 124, facilitating access to an information storage repository or databases 126. In some examples, the databases 126 includes storage devices that store information to be published and/or processed by the Guardrail system 122.

Additionally, a third-party application 114 executing on a third-party server 112, has programmatic access to the application server 116 via the programmatic interface provided by the Application Program Interface (API) server 118. For example, the third-party application 114, using information retrieved from the application server 116, may support one or more features or functions on a website hosted by a third party.

Figure 2:
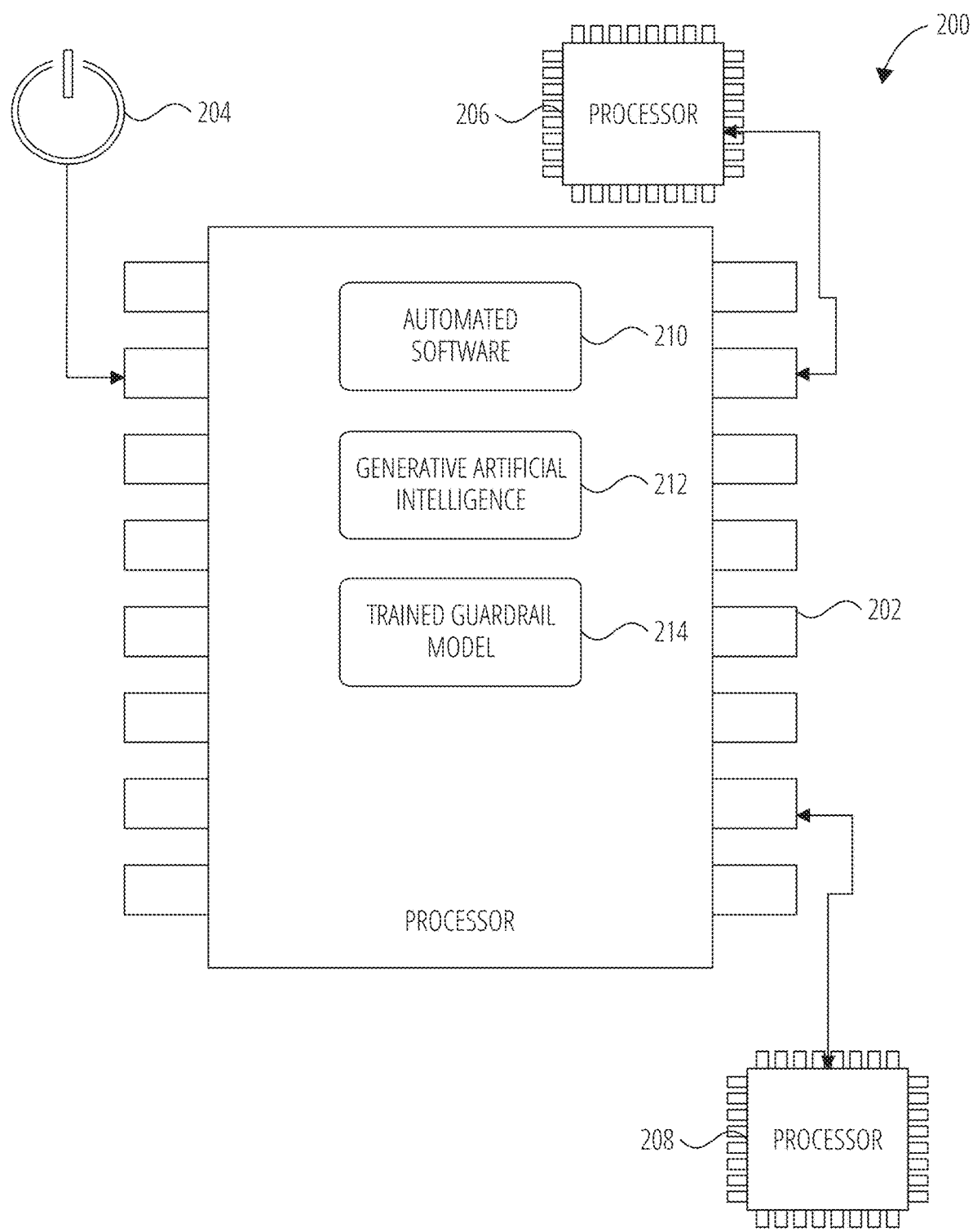
FIG. 2 is a diagrammatic representation of a processing environment, in accordance with some examples.

Turning now to FIG. 2, a diagrammatic representation of a processing environment 200 is shown, which includes the processor 206, the Processor 208, and a Processor 202 (e.g., a GPU, CPU, or combination thereof).

The Processor 202 is shown to be coupled to a power source 204, and to include (either permanently configured or temporarily instantiated) modules, namely an automated software 210, a generative artificial intelligence 212 (e.g., language model, such as a generative pre-trained transformer), and a trained guardrail model 214 (e.g., another language model that may be smaller than the generative artificial intelligence 212). The automated software 210 operationally generates a conversation with a user, turn by turn, or performs other automated tasks. The generative artificial intelligence 212 (e.g., large language model) operationally generates training data sets for the trained guardrail model 214, and the trained guardrail model 214 operationally verifies that output from the automated software 210 complies with rules. As illustrated, the processor 202 is communicatively coupled to both the processor 206 and processor 208. The modules can be configured or instantiated on a single processor or over multiple processors. Each module may be located on a different processor and/or server and/or location.

Figure 3:
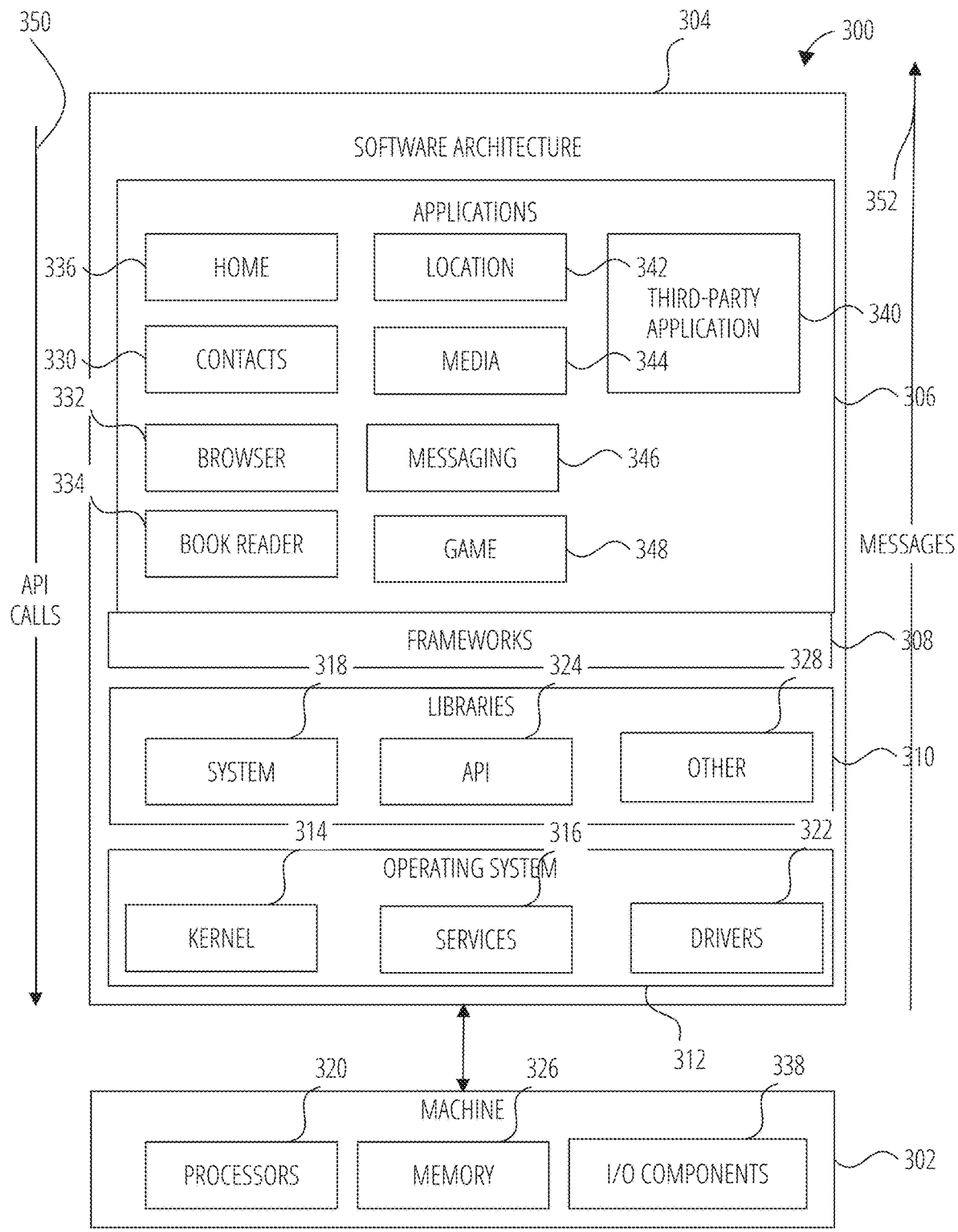
FIG. 3 is a block diagram showing a software architecture within which the present disclosure may be implemented, according to some examples.

FIG. 3 is a block diagram 300 illustrating a software architecture 304, which can be installed on any one or more of the devices described herein. The software architecture 304 is supported by hardware such as a machine 302 that includes processors 320, memory 326, and I/O components 338. In this example, the software architecture 304 can be conceptualized as a stack of layers, where each layer provides a particular functionality. The software architecture 304 includes layers such as an operating system 312, libraries 310, frameworks 308, and applications 306. Operationally, the applications 306 invoke API calls 350 through the software stack and receive messages 352 in response to the API calls 350.

The operating system 312 manages hardware resources and provides common services. The operating system 312 includes, for example, a kernel 314, services 316, and drivers 322. The kernel 314 acts as an abstraction layer between the hardware and the other software layers. For example, the kernel 314 provides memory management, Processor management (e.g., scheduling), component management, networking, and security settings, among other functionalities. The services 316 can provide other common services for the other software layers. The drivers 322 are responsible for controlling or interfacing with the underlying hardware. For instance, the drivers 322 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, and power management drivers.

The libraries 310 provide a low-level common infrastructure used by the applications 306. The libraries 310 can include system libraries 318 (e.g., C standard library) that provide functions such as memory allocation functions, string manipulation functions, mathematic functions, and the like. In addition, the libraries 310 can include API libraries 324 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., Web Kit to provide web browsing functionality), and the like. The libraries 310 can also include a wide variety of other libraries 328 to provide many other APIs to the applications 306.

The frameworks 308 provide a high-level common infrastructure used by the applications 306. For example, the frameworks 308 provide various graphical user interface (GUI) functions, high-level resource management, and high-level location services. The frameworks 308 can provide a broad spectrum of other APIs that can be used by the applications 306, some of which may be specific to a particular operating system or platform.

In some examples, the applications 306 may include a home application 336, a contacts application 330, a browser application 332, a book reader application 334, a location application 342, a media application 344, a messaging application 346, a game application 348, and a broad assortment of other applications such as a third-party application 340. The applications 306 are programs that execute functions defined in the programs. Various programming languages can be employed to create one or more of the applications 306, structured in a variety of manners, such as object-oriented programming languages (e.g., Objective-C, Java, or C++) or procedural programming languages (e.g., C or assembly language). In a specific example, the third-party application 340 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 340 can invoke the API calls 350 provided by the operating system 312 to facilitate functionality described herein.

Figure 4:
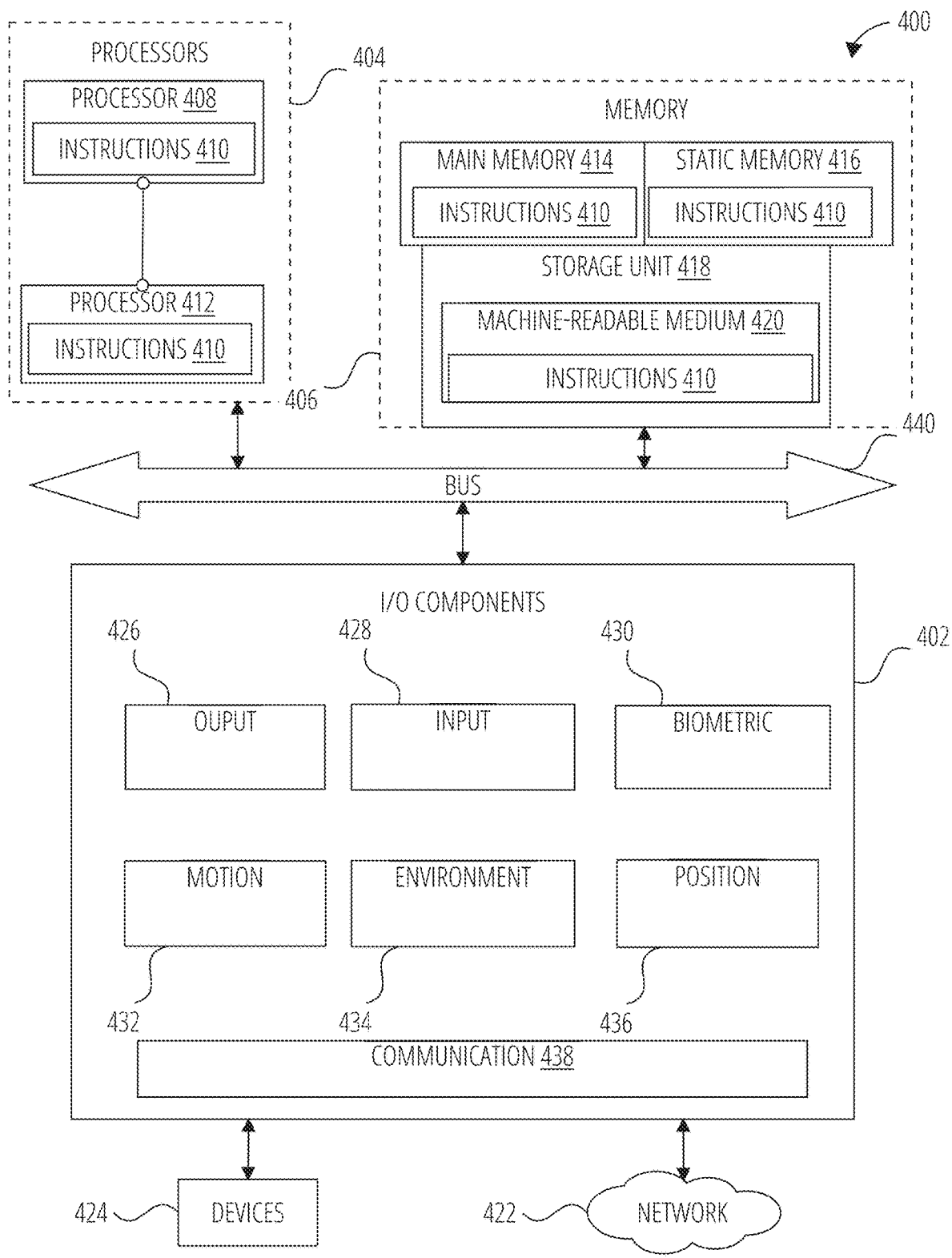
FIG. 4 is a diagrammatic representation of a machine in the form of a computer system within which a set of instructions may be executed for causing the machine to perform any one or more of the methodologies discussed herein, in accordance with some examples.

FIG. 4 is a diagrammatic representation of the machine 400 within which instructions 410 (e.g., software, a program, an application, an applet, an app, or other executable code) for causing the machine 400 to perform any one or more of the methodologies discussed herein may be executed. For example, the instructions 410 may cause the machine 400 to execute any one or more of the methods described herein. The instructions 410 transform the general, non-programmed machine 400 into a particular machine 400 programmed to carry out the described and illustrated functions in the manner described. The machine 400 may operate as a standalone device or be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 410, sequentially or otherwise, that specify actions to be taken by the machine 400. Further, while a single machine 400 is illustrated, the term "machine" may include a collection of machines that individually or jointly execute the instructions 410 to perform any one or more of the methodologies discussed herein.

The machine 400 may include processors 404, memory 406, and I/O components 402, which may be configured to communicate via a bus 440. In some examples, the processors 404 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application-Specific Integrated Circuit (ASIC), a Radio-Frequency Integrated Circuit (RFIC), another Processor, or any suitable combination thereof) may include, for example, a Processor 408 and a Processor 412 that execute the instructions 410. The term "Processor" is intended to include multi-core processors that may comprise two or more independent processors (sometimes referred to as "cores") that may execute instructions contemporaneously. Although FIG. 4 shows multiple processors 404, the machine 400 may include a single processor with a single core, a single processor with multiple cores (e.g., a multi-core processor), multiple processors with a single core, multiple processors with multiples cores, or any combination thereof.

The memory 406 includes a main memory 414, a static memory 416, and a storage unit 418, both accessible to the processors 404 via the bus 440. The main memory 406, the static memory 416, and storage unit 418 store the instructions 410 embodying any one or more of the methodologies or functions described herein. The instructions 410 may also reside, wholly or partially, within the main memory 414, within the static memory 416, within machine-readable medium 420 within the storage unit 418, within the processors 404 (e.g., within the processor's cache memory), or any suitable combination thereof, during execution thereof by the machine 400.

The I/O components 402 may include various components to receive input, provide output, produce output, transmit information, exchange information, or capture measurements. The specific I/O components 402 included in a particular machine depend on the type of machine. For example, portable machines such as mobile phones may include a touch input device or other such input mechanisms, while a headless server machine will likely not include such a touch input device. The I/O components 402 may include many other components not shown in FIG. 4. In various examples, the I/O components 402 may include output components 426 and input components 428. The output components 426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), or other signal generators. The input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 402 may include biometric components 430, motion components 432, environmental components 434, or position components 436, among a wide array of other components. For example, the biometric components 430 include components to detect expressions (e.g., hand expressions, facial expressions, vocal expressions, body gestures, or eye-tracking), measure biosignals (e.g., blood pressure, heart rate, body temperature, perspiration, or brain waves), or identify a person (e.g., voice identification, retinal identification, facial identification, fingerprint identification, or electroencephalogram-based identification). The motion components 432 include acceleration sensor components (e.g., accelerometer), gravitation sensor components, rotation sensor components (e.g., gyroscope). The environmental components 434 include, for example, one or cameras, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 436 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 402 further include communication components 438 operable to couple the machine 400 to a network 422 or devices 424 via respective coupling or connections. For example, the communication components 438 may include a network interface Component or another suitable device to interface with the network 422. In further examples, the communication components 438 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 424 may be another machine or any of a wide variety of peripheral devices (e.g., a peripheral device coupled via a USB).

Moreover, the communication components 438 may detect identifiers or include components operable to detect identifiers. For example, the communication components 438 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Data glyph, Maxi Code, PDF417, Ultra Code, UCC RSS-2D bar code, and other optical codes), or acoustic detection components (e.g., microphones to identify tagged audio signals). In addition, a variety of information may be derived via the communication components 438, such as location via Internet Protocol (IP) geolocation, location via Wi-Fi® signal triangulation, or location via detecting an NFC beacon signal that may indicate a particular location.

The various memories (e.g., main memory 414, static memory 416, and/or memory of the processors 404) and/or storage unit 418 may store one or more sets of instructions and data structures (e.g., software) embodying or used by any one or more of the methodologies or functions described herein. These instructions (e.g., the instructions 410), when executed by processors 404, cause various operations to implement the disclosed examples.

The instructions 410 may be transmitted or received over the network 422, using a transmission medium, via a network interface device (e.g., a network interface component included in the communication components 438) and using any one of several well-known transfer protocols (e.g., hypertext transfer protocol (HTTP)). Similarly, the instructions 410 may be transmitted or received using a transmission medium via a coupling (e.g., a peer-to-peer coupling) to the devices 424.

FIG. 5 illustrates an example guardrail task. In this example, the automated software 210 (e.g., virtual assistant, chatbot, etc.) in the restaurant domain provides information about an ongoing promotion to the user, thereby breaking rule 2. The guardrail model uses the last 2 turns of the conversation to classify the last two turns as a rule violation (which rule) or no violation.

Figure 6:
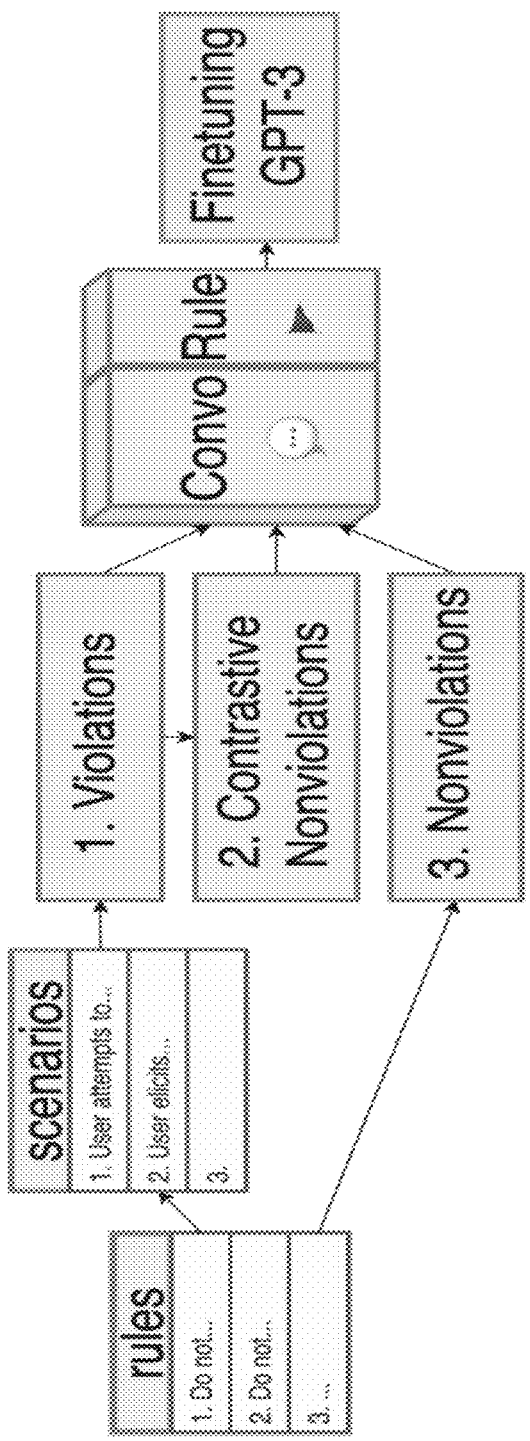
FIG. 6 illustrates construction of guardrail models.

FIG. 6 illustrates construction of guardrail models. In an example, a second model verifies that the generated text of a first model adheres to a set of rules. While some standards are likely incorporated into the model directly, the original models have not likely considered domain-specific behavior to avoid. In addition is utility in including a second level of verification in user-facing applications, where providing inaccurate or misleading text can cause serious harm.

In an example of building guardrails for conversational agents, a model-based agent A is having a conversation with an end user U about a specific topic, as illustrated in FIG. 5. A conversation C comprises a sequence of turns T. Each turn comprises a user's message ut and a response message from the assistant at. The example in FIG. 5 comprises three turns, each comprising two messages. A full conversation is therefore $$C=\{(u1,a1),(u2,a2),\ldots,(uT,aT)\}.$$

The instructions of the guardrail model are formulated as a set of N rules R enumerated by a system designer, denoted as:

$$R=\{r1,r2,\ldots,rN\}.$$

The goal of the guardrail model G is to check, at each agent's turn at, whether the output of the agent model A violates any of the designated rules. This is a multi-class classification problem, where the input of the guardrail is the last two turns ((ut, at)), and the output of the guardrail is either the number of the rule $r \in \{1, 2, \ldots, N\}$ violated, or None if the agent model output conforms to all rules.

$$G((ut,at))=r \in \{\text{None},1,2,\ldots,N\}.$$

In the last turn of the example conversation in FIG. 5, the automated software 210 breaks rule r=2: Do not provide information on promotions, discounts, or special offers, related to the restaurant. The expected behavior of the agent model A varies by the outcome of the guardrail. If no violation is found, the conversation continues as normal. Otherwise, the agent model A must regenerate its output, escalate to a human expert, or end the conversation.

While new large language models such as GPT-4 have advantages in terms of generative capability, distilling a smaller model from GPT-4 or other LLMs may be preferable for guardrails to reduce compute resources needed including training, processing, and storage. In addition to reductions in cost and latency, training a model edge cases to be learned through data. For example, consider rule 19 in Appendix Table 15 of U.S. Patent Application No. 63/460,280, Do not provide information on modes of transportation that are not buses, such as trains or taxis. Handling edge cases for this rule may be challenging. In San Francisco, are chats about Trolleybuses acceptable, and chats about Light Rail a violation? Instead of expanding the definition of this rule or adding a specific example, training data that captures all intricacies of a given rule to the training data are added.

An example multi-stage generation pipeline is shown in FIG. 6. For each rule r, a LLM generates a set of scenarios (Prompt 2). Each scenario represents a high-level reason why a rule might be violated. Consider the violated rule in FIG. 5: Do not provide information on promotions, discounts, or special offers related to the restaurant. One scenario that was generated was: A user asks if any coupons are available for a particular restaurant.

Scenarios are used to ensure that the generated conversations will cover a broad set of possibilities including edge cases. If conversations are generated without this step, these conversations are likely to omit tail scenarios. This also adds an additional layer of interpretability. A chatbot designer has the ability to add and remove scenarios in order to tailor the guardrail design.

As seen in FIG. 6, in the conversation generation step, 3 different types of conversations are generated to fine-tune our GPT-3 models: 1. Violations, 2. Contrastive Nonviolations, and 3. Nonviolations.

Starting with Violations, using the scenarios generated above, rule-violating synthetic user-agent conversations (Prompt 3) are generated. For each rule, we rotate through the 7-10 scenarios in a roundrobin fashion and generate an equal amount of conversations for each rule. The entire conversation is generated and truncate it to the last 2 turns. This generates more realistic conversations than prompting the model to just generate the last two turns of a hypothetical conversation.

In addition to rule-violating conversations, non-rule-violating conversations are generated. These conversations are produced in two ways. Contrastive Nonviolations are created by taking each rule-violating conversation and remove just the automated software 210 line that was a violation (aT). This is replaced with a non-violating assistant utterance (Prompt 4). By using this contrastive learning approach, non-violations are generated that are very similar to violations. As the entire conversation is the same up to the last message, this forces the model to focus on just the agent output.

Finally, Nonviolation conversations are generated by few-shot prompting GPT-4 to output a conversation that does not violate any of the rules in our rule group. These conversations are sliced at different points in the conversations to give us a wide variety of non-violations throughout the conversation, which will allow the model to generalize throughout the progression of the conversation. This set of generated data is used to fine-tune GPT-3 models.

The efficacy of the approach is demonstrated on virtual assistants in 3 domains: flights, restaurants, and buses. These are drawn from the Schema Guided Dialogue (SGD) dataset's 20 schemas. The SGD dataset contains conversations between a user and a task-based virtual assistant. Several of the conversations in the SGD dataset are used as few-shot examples to generate conversations. The dataset is diversified by randomizing the English levels (beginner/elementary, intermediate, advanced, proficient) of our users for each generation. The selected level in the conversational generation prompt is included (see Appendix Section A.1 of U.S. Patent Application No. 63/460,280 for details).

TABLE 1

Diversity and accuracy metrics of generated conversations. We look at distinct @ 1/2/3 to evaluate the diversity of text within a conversation. For correctness, we measure the correlation of the labels in the generated conversations using Amazon Mechanical Turk Masters-certified human labelers.

| Domain | distinct @ 1/2/3 | Corr. |
|---|---|---|
| Restaurants | 0.65/0.91/0.97 | 0.89 |
| Buses | 0.66/0.91/0.96 | 0.91 |
| Flights | 0.65/0.91/0.96 | 0.90 |

TABLE 2

Data splits for our generated datasets. For each domain, we split up our conversations into a train, test, and OOD set. We finetune GPT-3 models, and we evaluate these models on the test and OOD datasets.

| | Train | Test ID | Test OOD | Total |
|---|---|---|---|---|
| Rest. | 901 | 334 | 298 | 1533 |
| Bus | 946 | 351 | 255 | 1552 |
| Flights | 937 | 347 | 302 | 1586 |
| Total | 2784 | 1032 | 855 | 4671 |

7-8 rules for each schema are designed; the full rulesets can be found in the appendix in Tables 13, 14, and 15 of U.S. Patent Application No. 63/460,280. For simplicity, rules are chosen that can be verified within the turns of a conversation.

Rules are designed that do not overlap with each other for the purposes of clean multi-class classification, although this may be challenging in practice. GPT-4 is used to assist in generating realistic domain-specific rules for this paper (see Appendix Prompt 1 of U.S. Patent Application No. 63/460,280). Some of our rules are designed to maximize helpfulness/harmlessness.

TABLE 3

Guardrail accuracy metrics. We compare our fine-tuned approach (Distilled ✓contrastive ✓scenarios) with 3 baselines: 1. Prompt-based models, which are not fine-tuned, but include 5 few-shot examples from the in-distribution training set; 2. Distilled ✓scenarios models, which are fine-tuned without contrastive examples; 3. Distilled ✓contrastive models, which are fine-tuned with violations generated without scenarios. We calculate domain-level guardrail accuracy separately for in-distribution (ID) Scenarios, which consist of examples generated from scenarios included in the model training, and out-of-distribution (OOD) Scenarios, which consist of examples generated from scenarios not included in the training data. We find that Distilled ✓contrastive ✓scenarios outperforms GPT-4's performance. We find that this performance gain is especially important in terms of OOD data, which highlights our distillation approaches' ability to generalize well.

| | | | ID Scenario Acc. (%) ↑ | | | OOD Scenario Acc. (%) ↑ | | |
|---|---|---|---|---|---|---|---|---|
| | GPT Model | | Restaurant | Bus | Flight | Restaurant | Bus | Flight |
| Prompt-based | | ada | 40.1 | 71.5 | 73.2 | 14.1 | 49.8 | 49.7 |
| | | davinci | 57.2 | 71.5 | 69.2 | 34.9 | 48.6 | 45.0 |
| | | GPT-4 | 78.7 | 89.7 | 90.5 | 58.1 | 84.7 | 77.8 |
| Distilled | ✓scenarios | ada | 75.1 | 77.2 | 76.9 | 55.4 | 58.4 | 57.3 |
| | | davinci | 82.6 | 77.8 | 77.8 | 65.8 | 63.5 | 57.3 |

TABLE 3-continued

Guardrail accuracy metrics. We compare our fine-tuned approach (Distilled ✓contrastive ✓scenarios) with 3 baselines: 1. Prompt-based models, which are not fine-tuned, but include 5 few-shot examples from the in-distribution training set; 2. Distilled ✓scenarios models, which are fine-tuned without contrastive examples; 3. Distilled ✓contrastive models, which are fine-tuned with violations generated without scenarios. We calculate domain-level guardrail accuracy separately for in-distribution (ID) Scenarios, which consist of examples generated from scenarios included in the model training, and out-of-distribution (OOD) Scenarios, which consist of examples generated from scenarios not included in the training data. We find that Distilled ✓contrastive ✓scenarios outperforms GPT-4's performance. We find that this performance gain is especially important in terms of OOD data, which highlights our distillation approaches' ability to generalize well.

| GPT Model | | ID Scenario Acc. (%) ↑ | | | OOD Scenario Acc. (%) ↑ | | |
|---|---|---|---|---|---|---|---|
| | | Restaurant | Bus | Flight | Restaurant | Bus | Flight |
| ✓contrastive | ada | 90.4 | 88.9 | 91.9 | 80.2 | 83.5 | 84.8 |
| | davinci | 93.1 | 89.7 | 90.2 | 83.6 | 85.5 | 76.8 |
| ✓contrastive ✓scenarios | ada | 99.7 | 96.3 | 95.7 | 92.6 | 94.1 | 89.4 |
| | davinci | 99.7 | 98.2 | 94.8 | 94.3 | 96.1 | 93.4 |

The final dataset statistics are shown in Table 2. While there is not a separate development set for these domains, the method was developed on a separate domain data set. For each domain, there are roughly 500 violations, 500 nonviolations, and 200 non-contrastive non-violations generated. Each non-contrastive non-violation conversation is split into 5 training examples at the first 5 turns: $\{(u1, a1), \ldots, (u5, a5)\}$. In total, this gives us 4671 data points (pairs of turns) across all 3 domains. The final ratio for non-violating conversations to violating conversations can be found in 4

There is also an out-of-distribution (OOD) scenario analysis by holding out 3 random scenarios from the train set. The data split between in-distribution (ID) and out-of-distribution (OOD) scenarios can be found in Table 2. 3 random scenarios for each domain from fine-tuning to represent out-of-distribution examples are held out. The remaining 7 scenarios are used for our in-distribution examples. Maintaining the proportion of rules and scenarios in both ID train and test datasets, t the ID dataset is stratify split into train/test sets with a 73:27 ratio. In-conversation diversity and accuracy metrics is assessed in Table 1.

The generative diversity within each conversation is assessed using distinct@k, a standard conversation generation diversity metric. With almost 100% distinct@2 and distinct@3, the text generated within our conversations are found to be diverse. While the datasets are automatically generated and labeled, a subset of the labels is verified using Amazon Mechanical Turk (AMT). In the vast majority of cases, the generated conversations are labeled correctly. Additional setup and details can be found in Appendix A.4 of U.S. Patent Application No. 63/460,280.

In an example, GPT-4 generates all training data with the exception of the scenarios. For the scenarios, GPT-3.5-Turbo first generates 10 distinct scenarios for each rule as GPT-4 tended to output very specific scenarios. In an example, the model outputs a broader variety of scenarios in order to produce conversations with more variation. Scenarios are removed that were not suitable and include some examples of filtered-out scenarios in Appendix Section A.2 of U.S. Patent Application No. 63/460,280. For fine-tuning, default hyperparameters of OpenAI are used, e.g., n_epochs of 4, batch_size of 0.2% of the training set and default learning_rate_multiplier (0.05, 0.1, 0.2 depending on final batch_size, decided by the fine-tuning API).

TABLE 4

Class proportions: We report the counts of non-violation and violation instances in different domains and datasets. In all datasets, the violations are split uniformly across all the rules in that particular domain. Because we stratify split Train and Test_ID, the scenarios used to generate those particular violations are equally split amongst the Train and Test_ID set as well.

| Domain | Dataset | NV | Count V | Total |
|---|---|---|---|---|
| Flights | Train | 686 | 251 | 937 |
| | Test_ID | 254 | 93 | 347 |
| | Test_OOD | 150 | 152 | 302 |
| Buses | Train | 673 | 273 | 946 |
| | Test_ID | 252 | 99 | 351 |
| | Test_OOD | 127 | 128 | 255 |
| Restaurants | Train | 649 | 252 | 901 |
| | Test_ID | 238 | 96 | 334 |
| | Test_OOD | 149 | 149 | 298 |

In Table 3, evaluate the accuracy of the distilled guardrail approach (Distilled ✓contrastive ✓scenarios) were evaluated against the following model baselines:

Prompt-based: GPT-family models without fine-tuning, including the original GPT-3 base models (ada, and davinci) and GPT-4.

Distilled ✓scenarios: GPT-3 models fine-tuned with scenario-guided conversations but without contrastive examples.

Distilled ✓contrastive: GPT-3 models fine-tuned with contrastive examples but without scenario-guided conversations.

These experiments were conducted using the versions of the above OpenAI models on April 2023. Costs were also calculated using the OpenAI pricing page, as of April 2023 which can be found in the appendix of U.S. Patent Application No. 63/460,280. Separate evaluations are included of the seen scenarios (conversations guided by scenarios included in the training set) and unseen scenarios (conversations guided by scenarios excluded from the training set) in Table 3. Additional experiments, including accuracy on intermediate GPT-3 models and GPT-3.5-turbo, are included in Appendix Table 12 of U.S. Patent Application No. 63/460,280.

The fine-tuning approach (Distilled ✓contrastive ✓scenarios) achieves higher accuracy scores than all other baselines on both ID and OOD examples (Table 3) for all domains. This is likely due to the ability of the fine-tuned GPT-3 models to better learn the intended interpretations of each guardrail rule enabled by the fine-grained nature of the training data. This includes the notable performance gains compared to smaller prompt-based GPT3 methods. Ada, the smallest GPT-3 model, doubles its performance in many cases, showing that this distillation approach can enable even smaller models to achieve high performance. Yet the most surprising rise in performance is compared to GPT-4.

The distilled models improve over GPT-4 can be seen by looking at examples that GPT-4 labeled incorrectly but that an example model gets correct. As seen in Table 5, mistakes commonly occur when GPT-4 mispredicts conversations that do not have violations as violations. The fine-tuned models correctly classify these as nonviolations.

GPT-4 does 33% worse than an example fine-tuned davinci model at contrastive nonviolations (Table 6). This difference in performance on contrastive examples implies that GPT-4 is not good at classifying contrastive examples out of the box. While it may seem counterintuitive that GPT-4 does worse on self-generated examples, the nature of how contrastive non-violations are generated explains this result. These examples tend to illustrate settings where the user might be attempting some rule-breaking behavior, but the agent responds correctly. As GPT-4 is prompted to rewrite scenario generated rule-violating conversations, these are tricky to classify correctly.

User: i need help with my burn from coffee in flight. How to treat?
Assistant: I'm not a medical professional, but it's generally a good idea to seek medical attention for burns. You may want to consult a healthcare professional or visit a clinic at the airport if available.

GPT-4's prediction is incorrect because the virtual assistant does not provide personalized medical advice. Instead, the virtual assistant suggests that the user consults a healthcare professional for medical advice. More examples of such errors are in Appendix section A.7 of U.S. Patent Application No. 63/460,280.

Contrastive training examples are important in building a model that can deal with contrastive examples, as shown in the results comparing GPT-3+fine-tuning-contrastive and GPT-3+fine-tuning+contrastive models in FIG. 3. As stated in the Accuracy section, taking contrastive examples out of our training dataset results in a 15-35% reduction in accuracy for our models. Similarly, scenario-augmented training examples help improve model accuracy and generalization. Without the scenario-guided examples (shown in GPT-3+fine-tuning-scenario), the model can suffer from a 5% to 10% reduction in accuracy. This shows that it is important to fine-tune the distilled model with both a set of close example pairs and a wide variety of examples. These accuracy gains are crucial given the user-facing nature of the task.

Contrastive training examples are important in building a model that can deal with contrastive examples, as shown in the results comparing GPT-3+fine-tuning-contrastive and GPT-3+fine-tuning+contrastive models in Table 6.

As stated in the Accuracy section, taking contrastive examples out of a training dataset results in a 15-35%

TABLE 5

Three most common mistakes that GPT-4 made that our approach (Distilled ✓contrastive ✓scenarios) correctly predicted for each domain. These are the 3 most common label-prediction combinations in each domain (restaurant, buses, flights). For example, for the restaurant domain, there are 30 examples where the label was "None" (no rules were violated), but GPT-4 guessed that the example violated rule 4 (and our fine-tuned models guessed that this was correctly a non-violation). The rest of the combinations can be found in the tables in Appendix Section.

| Restaurant | | | Buses | | | Flights | | |
| --- | --- | --- | --- | --- | --- | --- | --- | --- |
| True Label | GPT4 Pred. | n | True Label | GPT4 Pred. | n | True Label | GPT4 Pred. | n |
| None | Rule 4 | 30 | None | Rule 16 | 29 | None | Rule 12 | 20 |
| None | Rule 3 | 26 | None | Rule 20 | 17 | None | Rule 8 | 13 |
| None | Rule 5 | 26 | Rule 23 | None | 9 | Rule 11 | None | 10 |

TABLE 6

Accuracy breakdown: We compare accuracy for GPT-4 with our fine-tuning Distilled ✓contrastive ✓ scenarios approach on the GPT-3 Davinci model. We compare these models on our different classes of generated data: Violations, Contrastive Nonviolations, and Nonviolations, as introduced in Table 2. These results are aggregated across all domains and both ID and OOD test datasets.

| | V (%)↑ | Con. NV (%)↑ | NV (%)↑ |
| --- | --- | --- | --- |
| GPT-4 | 84.8 | 63.6 | 99.3 |
| Our Approach | 92.3 | 96.6 | 100 |

In An example of a contrastive nonviolation conversation from the flight domain, GPT-4 incorrectly predicts that this conversation violates rule 12, "Do not provide medical advice in case of accidents, incidents, or health concerns on flights or in airports."

reduction in accuracy for example models. Similarly, scenario-augmented training examples help improve model accuracy and generalization. Without the scenario-guided examples (shown in GPT-3+fine-tuning-scenario), the model can suffer from a 5% to 10% reduction in accuracy.

Comparing the cost and latency of fine-tuned GPT-3 model inference to that in non-fine-tuned GPT-3.5 and GPT-4 in Table 7, fine-tuned GPT-3 models, which do not need prompts or examples, perform up to 15-30× faster and are up to 86× cheaper than GPT-4. While the latest version of GPT-3.5 is faster than GPT-4, it is still slower than the smaller fine-tuned models. Similarly, the cheapest and fastest model is our fine-tuned GPT-3 ada model, which still achieves much higher accuracy in both ID and OOD settings than GPT-3.5 and GPT-4, costing $0.0001 per turn. Latency and cost are important in production, and they can stack up quickly across many conversations with many turns. These inference costs do not account for the costs of fine-tuning our models and generating conversation data (discussed in section A.3), but this is a fixed initial cost.

TABLE 7

Inference latency (in seconds) and cost (in We compare inference latency and cost between fine-tuned GPT-4, GPT-3.5, and GPT-4. Cost calculations are based on Apr. 2023 pricing, see Appendix USD). Section A.3 for details.

| Model | Time (sec) ↓ | Cost $ ↓ |
|---|---|---|
| ada | 0.11 | .0001 |
| davinci | 0.26 | .0071 |
| GPT-3.5-turbo | 0.34 | .0006 |
| GPT-4 | 2.94 | .0086 |

In this disclosure, the impact of varying the size of the training set on the performance of a fine-tuned GPT-3 curie model is shown in Table 8, where the small (1 3 of data) and medium (2 3 of data) datasets are compared to the large dataset, which includes all the training samples. The proportion of scenarios and rules remained consistent across all three datasets. The small dataset contains roughly 1 conversation generated from each rule-scenario combination, while the medium dataset contains 2 and the large dataset contains 3-4.

Results show that while the small dataset performs moderately well, there is a significant increase in performance with the addition of more training data. In certain domains such as restaurants and flights, results of over 90% accuracy using a medium-sized dataset are achieved. However, in other domains such as buses, the difference in accuracy between the medium and large datasets is substantial, with accuracy jumping from 47.7% to 95.7%. The GPT-4 model is capable of generating diverse conversations within a specific rule and scenario combination because the addition of more conversations from these combinations continues to improve a model's performance.

Leveraging a distilled GPT-3 model combines the efficiency of a smaller model with the accuracy of a more powerful one. In all cases, fine-tuned GPT-3 models outperform Vanilla GPT-3 models in terms of accuracy. Even compared to a more powerful model, such as GPT-4, the distilled approach not only provides benefits in terms of latency and cost but also delivers improvements in terms of accuracy.

This is the case in both scenarios seen during model training, and unseen scenarios that have been held out. A major factor in its ability to generalize is the inclusion of contrastive examples. These examples allow GPT-3 to specifically better model the fine-grained differences that can occur between conversations with and without violations. Further, the ability of GPT-4 to produce these contrastive examples illustrates its generative power.

TABLE 8

Dataset sizes. We explore the effect of training set size, by fine-tuning a GPT-3 curie model with Small (33%), Medium (67%), and all of the original training data. We again split our results on scenarios seen in the training data and scenarios heldout. We include accuracy for seen and unseen scenarios.

| Domain | Size | Seen | Unseen |
|---|---|---|---|
| Restaurants | Sm. | 72.3 | 49.7 |
| | Med. | 96.0 | 91.7 |
| | All | 99.1 | 93.6 |

TABLE 8-continued

Dataset sizes. We explore the effect of training set size, by fine-tuning a GPT-3 curie model with Small (33%), Medium (67%), and all of the original training data. We again split our results on scenarios seen in the training data and scenarios heldout. We include accuracy for seen and unseen scenarios.

| Domain | Size | Seen | Unseen |
|---|---|---|---|
| Bus | Sm. | 70.1 | 46.7 |
| | Med. | 71.8 | 47.7 |
| | All | 96.3 | 95.7 |
| Flights | Sm. | 70.4 | 50.0 |
| | Med. | 96.0 | 90.7 |
| | All | 96.0 | 92.4 |

This disclosure describes a distillation approach for guardrail models. These verification models disclosed herein are crucial for enabling large language model-based tools to be deployed with confidence. In addition to potential applications in harm reduction, they also allow for conversational agent designers to include rules not accounted for in the original model training.

A distillation pipeline is disclosed that enables data generation across a broad variety of cases. By first generating rule-breaking scenarios, the resulting conversations will cover a broader set of possibilities than doing so without this step. Second, by transforming these rule-breaking conversations into non-rule-breaking conversations, the model is trained with a set of contrastive examples that better teach it how to differentiate between the cases. GPT-4 generated training data enables fine-tuned smaller models (GPT-3) to outperform baselines in a variety of metrics, such as accuracy, speed, and costs.

Machine-Learning Pipeline 800

Figure 8:
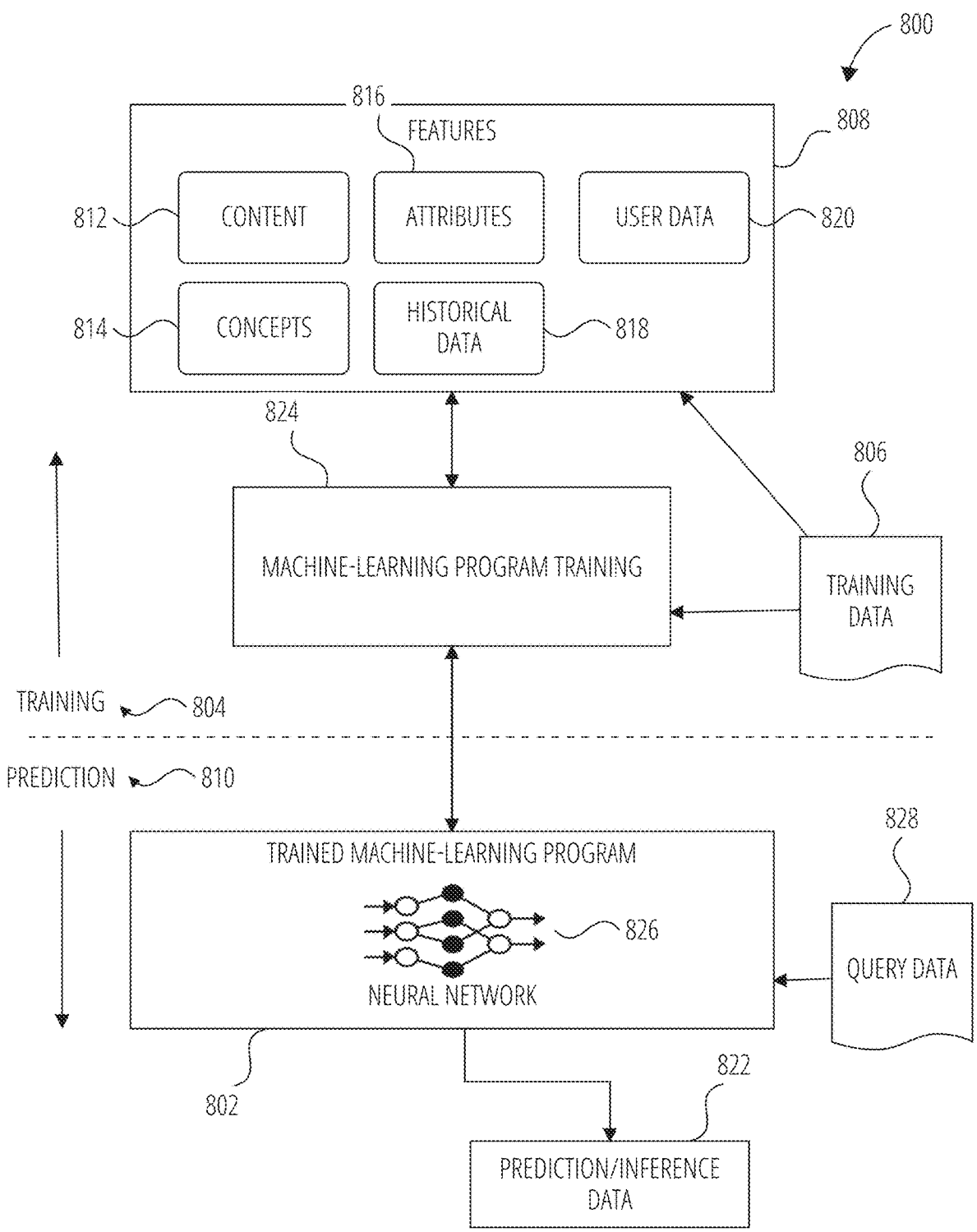
FIG. 8 illustrates training and use of a machine-learning program, according to some examples.

FIG. 8 is a flowchart depicting a machine-learning pipeline 800, according to some examples. The machine-learning pipeline 800 may be used to generate a trained model, for example the trained machine-learning program 802 of FIG. 8, to perform operations associated with searches and query responses.

Overview

Broadly, machine learning may involve using computer algorithms to automatically learn patterns and relationships in data, potentially without the need for explicit programming. Machine learning algorithms can be divided into three main categories: supervised learning, unsupervised learning, and reinforcement learning.

Supervised learning involves training a model using labeled data to predict an output for new, unseen inputs. Examples of supervised learning algorithms include linear regression, decision trees, and neural networks.

Unsupervised learning involves training a model on unlabeled data to find hidden patterns and relationships in the data. Examples of unsupervised learning algorithms include clustering, principal component analysis, and generative models like autoencoders.

Reinforcement learning involves training a model to make decisions in a dynamic environment by receiving feedback in the form of rewards or penalties. Examples of reinforcement learning algorithms include Q-learning and policy gradient methods.

Examples of specific machine learning algorithms that may be deployed, according to some examples, include logistic regression, which is a type of supervised learning algorithm used for binary classification tasks. Logistic regression models the probability of a binary response variable based on one or more predictor variables. Another example type of machine learning algorithm is Naïve Bayes, which is another supervised learning algorithm used for classification tasks. Naïve Bayes is based on Bayes' theorem and assumes that the predictor variables are independent of each other. Random Forest is another type of supervised learning algorithm used for classification, regression, and other tasks. Random Forest builds a collection of decision trees and combines their outputs to make predictions. Further examples include neural networks, which consist of interconnected layers of nodes (or neurons) that process information and make predictions based on the input data. Matrix factorization is another type of machine learning algorithm used for recommender systems and other tasks. Matrix factorization decomposes a matrix into two or more matrices to uncover hidden patterns or relationships in the data. Support Vector Machines (SVM) are a type of supervised learning algorithm used for classification, regression, and other tasks. SVM finds a hyperplane that separates the different classes in the data. Other types of machine learning algorithms include decision trees, k-nearest neighbors, clustering algorithms, and deep learning algorithms such as convolutional neural networks (CNN), recurrent neural networks (RNN), and transformer models. The choice of algorithm depends on the nature of the data, the complexity of the problem, and the performance requirements of the application.

The performance of machine learning models is typically evaluated on a separate test set of data that was not used during training to ensure that the model can generalize to new, unseen data.

Although several specific examples of machine learning algorithms are discussed herein, the principles discussed herein can be applied to other machine learning algorithms as well. Deep learning algorithms such as convolutional neural networks, recurrent neural networks, and transformers, as well as more traditional machine learning algorithms like decision trees, random forests, and gradient boosting may be used in various machine learning applications.

Two example types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

Training Phases 804

Figure 7:
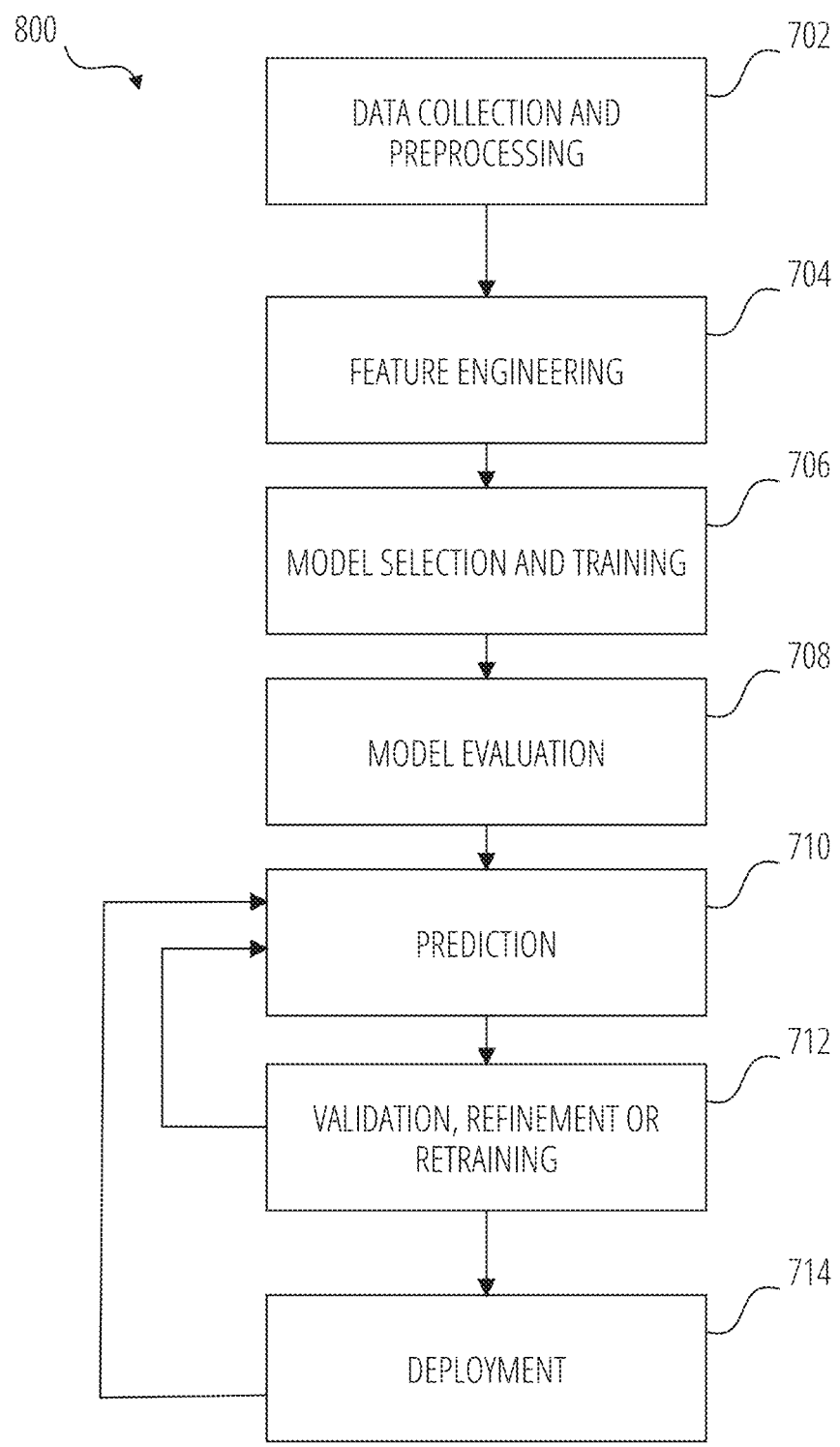
FIG. 7 illustrates a machine-learning pipeline, according to some examples.

Generating a trained machine-learning program 802, e.g., the trained guardrail model 214 may include multiple phases that form part of the machine-learning pipeline 800, including for example the following phases illustrated in FIG. 7:

Data collection and preprocessing 702: This phase may include acquiring and cleaning data to ensure that it is suitable for use in the machine learning model. This phase may also include removing duplicates, handling missing values, and converting data into a suitable format.

Feature engineering 704: This phase may include selecting and transforming the training data 806 to create features that are useful for predicting the target variable. Feature engineering may include (1) receiving features 808 (e.g., as structured or labeled data in supervised learning) and/or (2) identifying features 808 (e.g., unstructured or unlabeled data for unsupervised learning) in training data 806.

Model selection and training 706: This phase may include selecting an appropriate machine learning algorithm and training it on the preprocessed data. This phase may further involve splitting the data into training and testing sets, using cross-validation to evaluate the model, and tuning hyperparameters to improve performance.

Model evaluation 708: This phase may include evaluating the performance of a trained model (e.g., the trained machine-learning program 802) on a separate testing dataset. This phase can help determine if the model is overfitting or underfitting and determine whether the model is suitable for deployment.

Prediction 710: This phase involves using a trained model (e.g., trained machine-learning program 802) to generate predictions on new, unseen data.

Validation, refinement or retraining 712: This phase may include updating a model based on feedback generated from the prediction phase, such as new data or user feedback.

Deployment 714: This phase may include integrating the trained model (e.g., the trained machine-learning program 802) into a more extensive system or application, such as a web service, mobile app, or IoT device. This phase can involve setting up APIs, building a user interface, and ensuring that the model is scalable and can handle large volumes of data.

FIG. 8 illustrates further details of two example phases, namely a training phase 804 (e.g., part of the model selection and trainings 706) and a prediction phase 810 (part of prediction 710). Prior to the training phase 804, feature engineering 704 is used to identify features 808. This may include identifying informative, discriminating, and independent features for effectively operating the trained machine-learning program 802 in pattern recognition, classification, and regression. In some examples, the training data 806 includes labeled data, known for pre-identified features 808 and one or more outcomes. Each of the features 808 may be a variable or attribute, such as an individual measurable property of a process, article, system, or phenomenon represented by a data set (e.g., the training data 806). Features 808 may also be of different types, such as numeric features, strings, and graphs, and may include one or more of content 812, concepts 814, attributes 816, historical data 818, and/or user data 820, merely for example.

In training phase 804, the machine-learning pipeline 800 uses the training data 806 to find correlations among the features 808 that affect a predicted outcome or prediction/inference data 822.

With the training data 806 and the identified features 808, the trained machine-learning program 802 is trained during the training phase 804 during machine-learning program training 824. The machine-learning program training 824 appraises values of the features 808 as they correlate to the training data 806. The result of the training is the trained machine-learning program 802 (e.g., a trained or learned model).

Further, the training phase 804 may involve machine learning, in which the training data 806 is structured (e.g., labeled during preprocessing operations). The trained machine-learning program 802 implements a neural network 826 capable of performing, for example, classification and clustering operations. In other examples, the training phase 804 may involve deep learning, in which the training data 806 is unstructured, and the trained machine-learning program 802 implements a deep neural network 826 that can perform both feature extraction and classification/clustering operations.

In some examples, a neural network 826 may be generated during the training phase 804, and implemented within the trained machine-learning program 802. The neural network 826 includes a hierarchical (e.g., layered) organization of neurons, with each layer consisting of multiple neurons or nodes. Neurons in the input layer receive the input data, while neurons in the output layer produce the final output of the network. Between the input and output layers, there may be one or more hidden layers, each consisting of multiple neurons.

Each neuron in the neural network 826 operationally computes a function, such as an activation function, which takes as input the weighted sum of the outputs of the neurons in the previous layer, as well as a bias term. The output of this function is then passed as input to the neurons in the next layer. If the output of the activation function exceeds a certain threshold, an output is communicated from that neuron (e.g., transmitting neuron) to a connected neuron (e.g., receiving neuron) in successive layers. The connections between neurons have associated weights, which define the influence of the input from a transmitting neuron to a receiving neuron. During the training phase, these weights are adjusted by the learning algorithm to optimize the performance of the network. Different types of neural networks may use different activation functions and learning algorithms, affecting their performance on different tasks. The layered organization of neurons and the use of activation functions and weights enable neural networks to model complex relationships between inputs and outputs, and to generalize to new inputs that were not seen during training.

In some examples, the neural network 826 may also be one of several different types of neural networks, such as a single-layer feed-forward network, a Multilayer Perceptron (MLP), an Artificial Neural Network (ANN), a Recurrent Neural Network (RNN), a Long Short-Term Memory Network (LSTM), a Bidirectional Neural Network, a symmetrically connected neural network, a Deep Belief Network (DBN), a Convolutional Neural Network (CNN), a Generative Adversarial Network (GAN), an Autoencoder Neural Network (AE), a Restricted Boltzmann Machine (RBM), a Hopfield Network, a Self-Organizing Map (SOM), a Radial Basis Function Network (RBFN), a Spiking Neural Network (SNN), a Liquid State Machine (LSM), an Echo State Network (ESN), a Neural Turing Machine (NTM), or a Transformer Network, merely for example.

In addition to the training phase 804, a validation phase may be performed on a separate dataset known as the validation dataset. The validation dataset is used to tune the hyperparameters of a model, such as the learning rate and the regularization parameter. The hyperparameters are adjusted to improve the model's performance on the validation dataset.

Once a model is fully trained and validated, in a testing phase, the model may be tested on a new dataset. The testing dataset is used to evaluate the model's performance and ensure that the model has not overfitted the training data.

In prediction phase 810, the trained machine-learning program 802 uses the features 808 for analyzing query data 828 to generate inferences, outcomes, or predictions, as examples of a prediction/inference data 822. For example, during prediction phase 810, the trained machine-learning program 802 generates an output. Query data 828 is provided as an input to the trained machine-learning program 802, and the trained machine-learning program 802 generates the prediction/inference data 822 as output, responsive to receipt of the query data 828.

In some examples, the trained machine-learning program 802 may be a generative AI model. Generative AI is a term that may refer to any type of artificial intelligence that can create new content from training data 806. For example, generative AI can produce text, images, video, audio, code, or synthetic data similar to the original data but not identical. Some of the techniques that may be used in generative AI are:

Convolutional Neural Networks (CNNs): CNNs may be used for image recognition and computer vision tasks. CNNs may, for example, be designed to extract features from images by using filters or kernels that scan the input image and highlight important patterns.

Recurrent Neural Networks (RNNs): RNNs may be used for processing sequential data, such as speech, text, and time series data, for example. RNNs employ feedback loops that allow them to capture temporal dependencies and remember past inputs.

Generative adversarial networks (GANs): GNNs may include two neural networks: a generator and a discriminator. The generator network attempts to create realistic content that can "fool" the discriminator network, while the discriminator network attempts to distinguish between real and fake content. The generator and discriminator networks compete with each other and improve over time.

Variational autoencoders (VAEs): VAEs may encode input data into a latent space (e.g., a compressed representation) and then decode it back into output data. The latent space can be manipulated to generate new variations of the output data. VAEs may use self-attention mechanisms to process input data, allowing them to handle long text sequences and capture complex dependencies.

Transformer models: Transformer models may use attention mechanisms to learn the relationships between different parts of input data (such as words or pixels) and generate output data based on these relationships. Transformer models can handle sequential data, such as text or speech, as well as non-sequential data, such as images or code.

In generative AI examples, the output prediction/inference data 822 include predictions, translations, summaries or media content.

Figure 9:
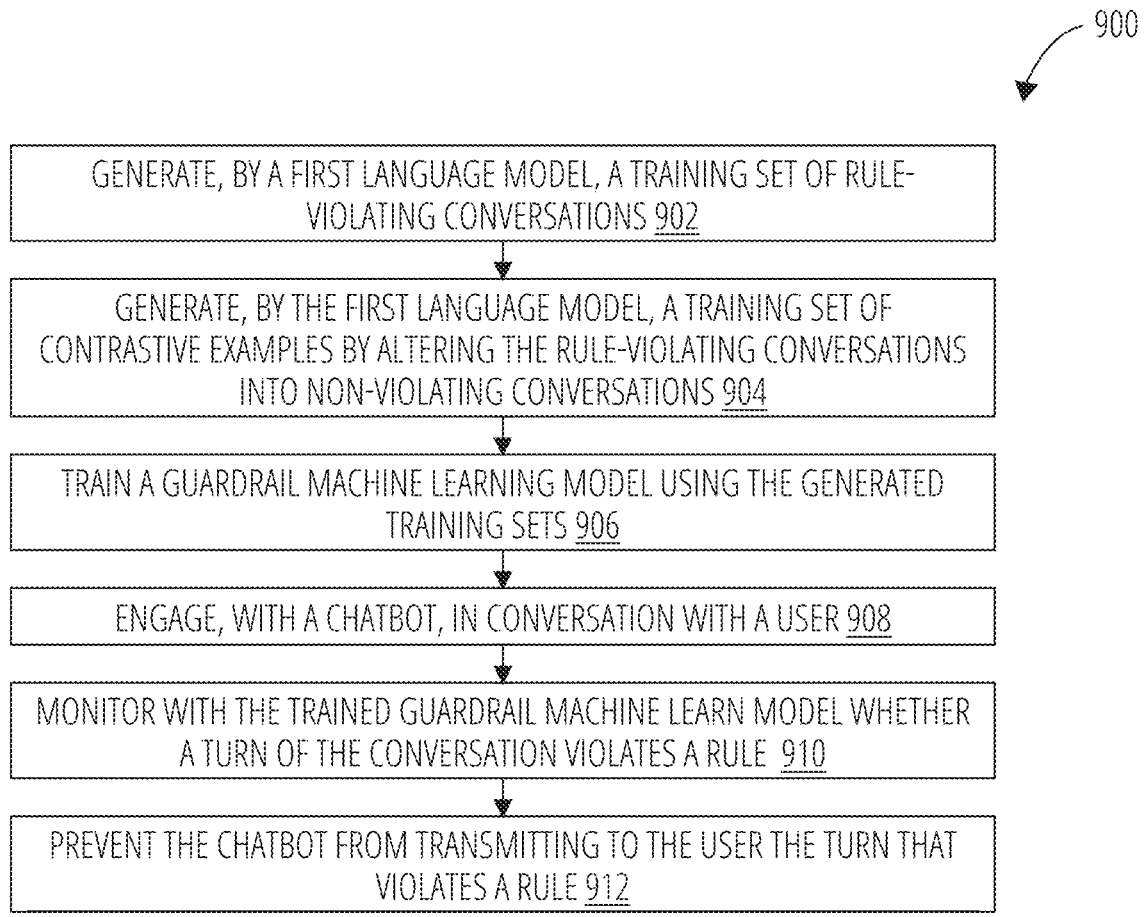
FIG. 9 illustrates a routine 900 for guarding an automated software in accordance with one embodiment.

FIG. 9 is a flowchart illustrating a routine 900 for guarding an automated software with a guardrail machine learning model, according to some examples.

The routine 900 may be embodied in computer-readable instructions for execution by one or more processors such that operations of the routine 900 may be performed in part or in whole by the functional components of processing environment 200; accordingly, the routine 900 is described below by way of example with reference thereto. However, it shall be appreciated that at least some of the operations of the routine 900 may be deployed on various other hardware configurations than processing environment 200. Note that the description of operations of the routine 900 below may represent only one iterative cycle and multiple cycles may be executed.

In one aspect, the routine 900 of guarding an automated software 210, includes generating block 902, by a first language model 212, a training set of rule-violating data (e.g., conversations); generating block 904, by the first language model 212, a training set of contrastive examples by altering the rule-violating data (e.g., conversations) into non-violating data (conversations); training block 906 a guardrail machine learning model 214 using the generated training sets; generating an output based on user input (e.g., engaging block 908, with automated software 210, in conversation with a user); monitoring block 910 with the trained guardrail machine learn model 214 whether the generated output (e.g., a turn of the conversation) violates a rule; and preventing block 912 the automated software from transmitting to the user the generated output (e.g., turn) that violates a rule.

Examples

1. A method of guarding automated software by a guardrail machine learning model, comprising:
   generating, by a first language model, a training set of rule-violating data;
   generating, by the first language model, a training set of contrastive examples by altering the rule-violating data into non-violating data;
   training the guardrail machine learning model using the generated training sets;
   generating, with the automated software, an output based on a user input;
   monitoring with the trained guardrail machine learn model whether the generated output violates a rule; and
   preventing the automated software from transmitting to the user the generated output that violates a rule.

2. The method of example 1, further comprising modifying the generated output that violates the rule and transmitting the modified output to the user.

3. The method of any of the preceding examples, wherein the guardrail machine learning model is smaller than the first language model.

4. The method of any of the preceding examples, wherein the first language model, trained guardrail machine learning model and the automated software are run on different servers.

5. The method of any of the preceding examples, further comprising:
   generating, by the first language model, a training set of non-violating data and wherein the training trains the guardrail machine learning model on the training set of non-violating data.

6. The method of any of the preceding examples, further comprising:
   generating, with the first language model, a scenario and wherein the generating the training sets is based on the generated scenario.

7. The method of any of the preceding examples, wherein the trained guardrail machine learning model has a lower latency than the first language model.

8. The method of any of the preceding examples, further comprising:
   generating, with the first language model, a set of rules for a domain.

9. The method of example 8, wherein the set of rules is non-overlapping.

10. A non-transitory computer-readable storage medium, the computer-readable storage medium including instructions that when executed by a computer, cause the computer to:
    generate, by a first language model, a training set of rule-violating data;
    generate, by the first language model, a training set of contrastive examples by altering the rule-violating data into non-violating data;
    train a guardrail machine learning model using the generated training sets;
    generate, with an automated software, an output based on a user input;
    monitor with the trained guardrail machine learn model whether the generated output violates a rule; and
    prevent the automated software from transmitting to the user the generated output that violates a rule.

11. A computing apparatus comprising:
    a processor; and
    a non-transitory memory storing instructions that, when executed by the processor, configure the apparatus to:
    generate, by a first language model, a training set of rule-violating data;
    generate, by the first language model, a training set of contrastive examples by altering the rule-violating data into non-violating data;
    train a guardrail machine learning model using the generated training sets;
    generate, with an automated software, an output based on a user input;
    monitor with the trained guardrail machine learn model whether the generated output violates a rule; and
    prevent the automated software from transmitting to the user the generated output that violates a rule.

12. The computing apparatus of example 11, wherein the instructions further configure the apparatus to modify the generated output that violates the rule and transmitting the modified output to the user.

13. The computing apparatus of any of the preceding examples, wherein the guardrail machine learning model is smaller than the first language model.

14. The computing apparatus of any of the preceding examples, wherein the first language model, trained guardrail machine learning model and the automated software are run on different servers.

15. The computing apparatus of any of the preceding examples, wherein the instructions further configure the apparatus to:
    generate, by the first language model, a training set of non-violating data and wherein the training trains the guardrail machine learning model on the training set of non-violating data.

16. The computing apparatus of any of the preceding examples, wherein the instructions further configure the apparatus to:
    generate, with the first language model, a scenario and wherein the generating the training sets is based on the generated scenario.

17. The computing apparatus of any of the preceding examples, wherein the trained guardrail machine learn model has a lower latency than the first language model.

18. The computing apparatus of any of the preceding examples, wherein the instructions further configure the apparatus to:
    generate, with the first language model, a set of rules for a domain.

19. The computing apparatus of example 18, wherein the set of rules is non-overlapping.

20. The computing apparatus of any of the preceding examples, wherein the first language model and trained guardrail model are generative pre-trained transformers.

What is claimed is:
1. A method of guarding automated software by a guardrail machine learning model, comprising:
   generating, by a first language model, a training set of rule-violating data;

generating, by the first language model or a second language model, a training set of contrastive examples by altering the rule-violating data into non-violating data;

training the guardrail machine learning model using the generated training sets of rule-violating data and contrastive examples;

generating, with the automated software, an output based on a user input;

monitoring with the trained guardrail machine learning model whether the generated output violates a rule; and preventing the automated software from transmitting to the user the generated output that violates the rule.

2. The method of claim 1, further comprising modifying the generated output that violates the rule and transmitting the modified output to the user.

3. The method of claim 1, wherein the guardrail machine learning model is smaller than the first language model.

4. The method of claim 1, wherein the first language model, trained guardrail machine learning model and the automated software are run on different servers.

5. The method of claim 1, further comprising:
generating, by the first language model, a training set of non-violating data and wherein the training trains the guardrail machine learning model on the training set of non-violating data.

6. The method of claim 1, further comprising:
generating, with the first language model, a scenario and wherein the generating the training sets of rule-violating data and contrastive examples is based on the generated scenario.

7. The method of claim 1, wherein the trained guardrail machine learning model has a lower latency than the first language model.

8. The method of claim 1, further comprising:
generating, with the first language model, a set of rules for a domain.

9. The method of claim 8, wherein the set of rules is non-overlapping.

10. A non-transitory computer-readable storage medium, the computer-readable storage medium including instructions that when executed by a computer, cause the computer to:
generate, by a first language model, a training set of rule-violating data;
generate, by the first language model or a second language model, a training set of contrastive examples by altering the rule-violating data into non-violating data;
train a guardrail machine learning model using the generated training sets of rule-violating data and contrastive examples:
generate, with an automated software, an output based on a user input;
monitor with the trained guardrail machine learning model whether the generated output violates a rule; and
prevent the automated software from transmitting to the user the generated output that violates the rule.

11. A computing apparatus comprising:
a processor; and
a non-transitory memory storing instructions that, when executed by the processor, configure the apparatus to:
generate, by a first language model, a training set of rule-violating data;
generate, by the first language model or a second language model, a training set of contrastive examples by altering the rule-violating data into non-violating data;
train a guardrail machine learning model using the generated training sets of rule-violating data and contrastive examples;
generate, with an automated software, an output based on a user input;
monitor with the trained guardrail machine learning model whether the generated output violates a rule; and
prevent the automated software from transmitting to the user the generated output that violates the rule.

12. The computing apparatus of claim 11, wherein the instructions further configure the apparatus to modify the generated output that violates the rule and transmitting the modified output to the user.

13. The computing apparatus of claim 11, wherein the guardrail machine learning model is smaller than the first language model.

14. The computing apparatus of claim 11, wherein the first language model, trained guardrail machine learning model and the automated software are run on different servers.

15. The computing apparatus of claim 11, wherein the instructions further configure the apparatus to:
generate, by the first language model, a training set of non-violating data and wherein the training trains the guardrail machine learning model on the training set of non-violating data.

16. The computing apparatus of claim 11, wherein the instructions further configure the apparatus to:
generate, with the first language model, a scenario and wherein the generating the training sets of rule-violating data and contrastive examples is based on the generated scenario.

17. The computing apparatus of claim 11, wherein the trained guardrail machine learning model has a lower latency than the first language model.

18. The computing apparatus of claim 11, wherein the instructions further configure the apparatus to:
generate, with the first language model, a set of rules for a domain.

19. The computing apparatus of claim 18, wherein the set of rules is non-overlapping.

20. The computing apparatus of claim 11, wherein the first language model and trained guardrail machine learning model are generative pre-trained transformers.

* * * * *